US011592907B2

(12) United States Patent
Wu et al.

(10) Patent No.: US 11,592,907 B2
(45) Date of Patent: Feb. 28, 2023

(54) GESTURE-TRIGGERED AUGMENTED-REALITY

(71) Applicant: Google LLC, Mountain View, CA (US)

(72) Inventors: Shengzhi Wu, Mountain View, CA (US); Alexander James Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 51 days.

(21) Appl. No.: 16/949,206

(22) Filed: Oct. 20, 2020

(65) Prior Publication Data

US 2022/0121288 A1    Apr. 21, 2022

(51) Int. Cl.
*G06F 3/01* (2006.01)
*G06F 3/048* (2013.01)
(Continued)

(52) U.S. Cl.
CPC ......... *G06F 3/017* (2013.01); *G02B 27/0172* (2013.01); *G06F 3/014* (2013.01);
(Continued)

(58) Field of Classification Search
CPC ........ G06F 3/017; G06F 3/014; G06F 3/0346; G02B 27/0172; G02B 2027/0138;
(Continued)

(56) References Cited

U.S. PATENT DOCUMENTS 6,597,389 B2 * 7/2003 Tanaka ............... H04N 5/23203
348/E5.043
8,723,957 B2 * 5/2014 Kim .................. H04N 5/232411
901/17

(Continued)

FOREIGN PATENT DOCUMENTS

| CN | 105824411 A | 8/2016 |
| CN | 107340868 A | 11/2017 |
| WO | 2018127782 A1 | 7/2018 |

OTHER PUBLICATIONS

Ham, et al., "Smart Wristband: Touch-and-Motion-Tracking Wearable 3D Input Device for Smart Glasses", LNCS 8530, 2014, pp. 109-118.

(Continued)

*Primary Examiner* — Jordany Nunez
(74) *Attorney, Agent, or Firm* — Brake Hughes Bellermann LLP

(57) ABSTRACT

A user may routinely wear or hold more than one computing devices. One of the computing devices may be a head-mounted computing-device configured for augmented reality. The head-mounted computing-device may include a camera. While imaging, the camera can consume power and processing resources that diminish a battery of the head-mounted computing device. To improve a battery life and to enhance a user's privacy, imaging of the camera can be deactivated during periods when the user is not interacting with the head-mounted computing device and activated when the user wishes to interact with the head-mounted computing device. The activation of the camera can be triggered by gestured data collected by a computing device other than the head-mounted computing-device.

18 Claims, 13 Drawing Sheets

(51) Int. Cl.
*G06F 3/16* (2006.01)
*H04N 5/232* (2006.01)
*G06V 40/20* (2022.01)
*G02B 27/01* (2006.01)
*G06F 3/0346* (2013.01)
*H04R 1/10* (2006.01)

(52) U.S. Cl.
CPC ............ *G06F 3/0346* (2013.01); *G06V 40/28* (2022.01); *H04N 5/23203* (2013.01); *H04N 5/232411* (2018.08); *H04R 1/1016* (2013.01); *G02B 2027/014* (2013.01); *G02B 2027/0138* (2013.01); *G02B 2027/0178* (2013.01)

(58) Field of Classification Search
CPC ...... G02B 2027/014; G02B 2027/0178; G06V 40/28; H04N 5/23203; H04N 5/232411; H04R 1/1016
See application file for complete search history.

(56) References Cited

U.S. PATENT DOCUMENTS

| | | | | |
|---|---|---|---|---|
| 9,392,168 | B2* | 7/2016 | Kim | H04N 5/23222 |
| 9,649,558 | B2* | 5/2017 | Stafford | G06F 3/011 |
| 10,282,089 | B2* | 5/2019 | Foerster | G06F 3/0237 |
| 10,460,455 | B2* | 10/2019 | Giurgica-Tiron | G06F 3/017 |
| 10,474,857 | B2* | 11/2019 | Todescato | G06K 7/1091 |
| 10,754,423 | B2* | 8/2020 | Kim | G06F 3/012 |
| 10,785,307 | B2* | 9/2020 | DeLuca | H04W 4/023 |
| 10,788,897 | B1* | 9/2020 | Benko | G06F 3/011 |
| 10,884,498 | B2* | 1/2021 | Kaneko | G02B 27/017 |
| 11,023,045 | B2* | 6/2021 | Liu | G06F 3/014 |
| 11,227,043 | B2* | 1/2022 | Chung | G06F 21/36 |
| 2001/0019360 | A1* | 9/2001 | Tanaka | H04N 5/23203 348/14.03 |
| 2011/0134251 | A1* | 6/2011 | Kim | H04N 5/232411 348/E5.09 |
| 2011/0294579 | A1* | 12/2011 | Marks | H04N 13/10 463/36 |
| 2012/0007713 | A1 | 1/2012 | Nasiri et al. | |
| 2013/0106981 | A1* | 5/2013 | Tsai | H04M 3/569 348/E7.083 |
| 2014/0055352 | A1* | 2/2014 | Davis | A61B 5/1125 345/156 |
| 2014/0092264 | A1* | 4/2014 | Kim | H04N 5/232411 348/207.11 |
| 2014/0118257 | A1* | 5/2014 | Baldwin | G06F 3/038 345/158 |
| 2014/0198035 | A1* | 7/2014 | Bailey | G06F 3/0484 345/156 |
| 2015/0258431 | A1* | 9/2015 | Stafford | G06V 40/11 463/31 |
| 2015/0261495 | A1* | 9/2015 | Smus | G06F 3/167 345/156 |
| 2016/0173783 | A1* | 6/2016 | Kim | H04N 5/23287 348/208.11 |
| 2016/0180574 | A1* | 6/2016 | Kaminitz | G06T 11/60 345/633 |
| 2016/0295195 | A1* | 10/2016 | Thorn | H04N 13/239 |
| 2016/0364910 | A1* | 12/2016 | Higgins | A63F 13/235 |
| 2017/0097683 | A1* | 4/2017 | Lo | G06V 40/20 |
| 2019/0122437 | A1* | 4/2019 | Pinti | G06V 10/225 |
| 2019/0139323 | A1 | 5/2019 | Dearman et al. | |
| 2019/0154439 | A1* | 5/2019 | Binder | G01S 13/878 |
| 2019/0188433 | A1* | 6/2019 | Todescato | G06K 7/1091 |
| 2019/0228533 | A1* | 7/2019 | Giurgica-Tiron | G06F 3/014 |
| 2019/0370544 | A1 | 12/2019 | Wright et al. | |
| 2020/0106835 | A1* | 4/2020 | DeLuca | H04W 4/023 |
| 2020/0301509 | A1* | 9/2020 | Liu | G06F 3/015 |

OTHER PUBLICATIONS

Rupprecht, et al., "Virtual Reality Meets Smartwatch: Intuitive, Natural, and Multi-Modal Interaction", CHI 2017, May 6-11, 2017, pp. 2884-2890.
Laput, et al., "Sensing Fine-Grained Hand Activity with Smartwatches", CHI 2019, May 4-9, 2019, 13 pages.
Loclair, et al., "PinchWatch: A Wearable Device for One-Handed Microinteractions", MobileHCI 2010, Sep. 7-10, 2010, 4 pages.
International Search Report and Written Opinion for PCT Application No. PCT/US2021/071864, dated Feb. 2, 2022, 11 pages.
Lee, et al., "Interaction Methods for Smart Glasses", ACM Computing Surveys, vol. 1, No. 0, Article 1, arXiv:1707.09728v1, Jul. 31, 2017, 35 pages.

* cited by examiner

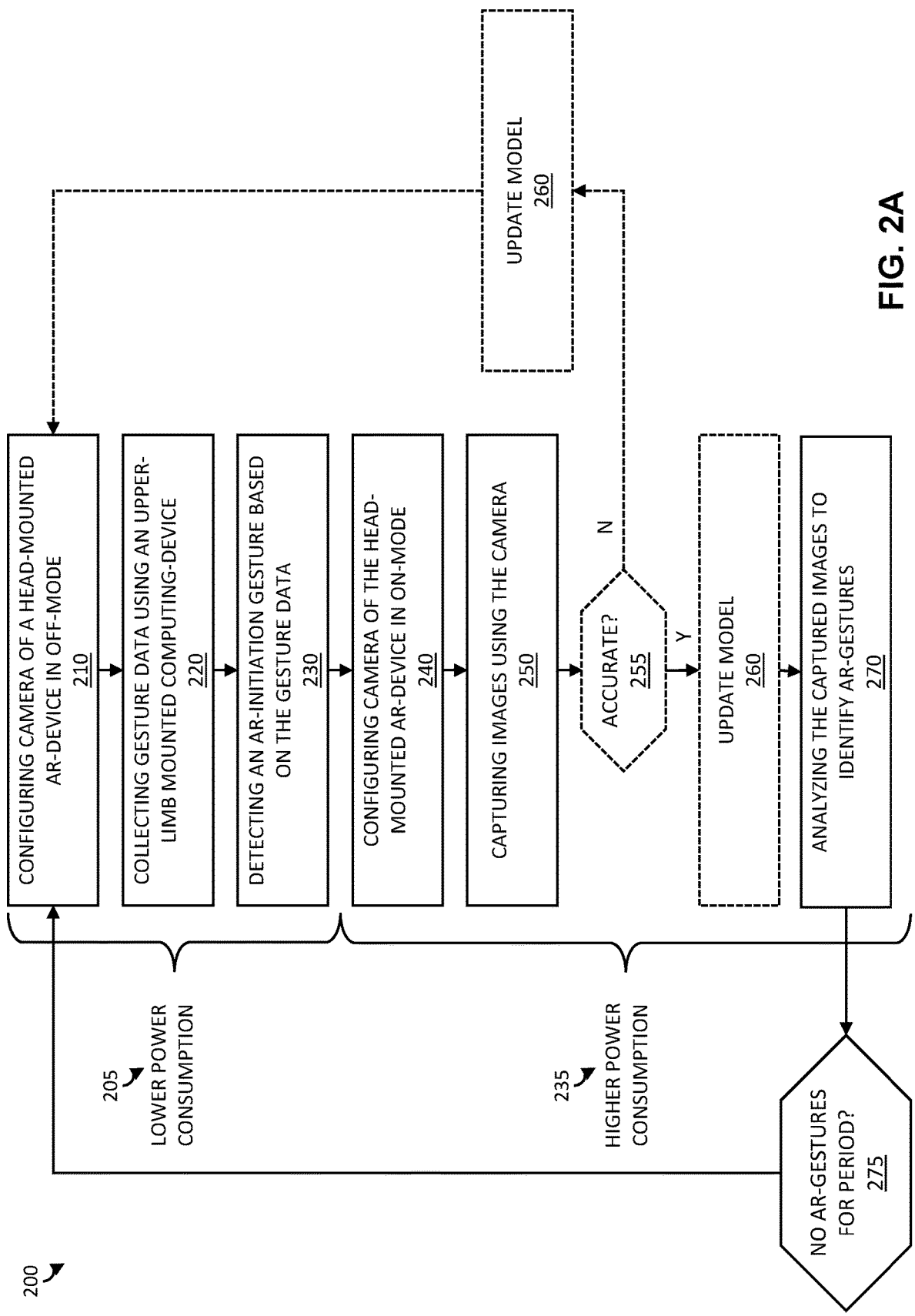

GESTURE-TRIGGERED AUGMENTED-REALITY

FIELD OF THE DISCLOSURE

The present disclosure relates to augmented-reality (AR) and more specifically, to the functions and interactions of handheld and/or wearable devices in an AR environment.

BACKGROUND

An AR environment may include one or more computing devices configured to blend real information with virtual information so that a user can perceive and interact with the virtual information as if it were a natural part of the user's environment. Generating the AR requires a device (or devices) to sense a user and/or the user's environment; to process the sensed information to determine AR information, and to display the AR information to the user. For example, AR glasses may simultaneously capture images of a user's view and display AR information overlaid onto the user's view. For sensing, an AR-device may include a camera that is required to have sufficient resolution and speed to facilitate an immersive AR experience. While imaging, the camera may consume a relatively large amount of power for a wearable AR-device, such as AR glasses.

SUMMARY

In at least one aspect, the present disclosure generally describes an augmented-reality (AR) system that includes a head-mounted computing-device (e.g., AR glasses, AR earbud). The head-mounted computing-device includes a camera, which can be configured into an ON-mode to capture images or an OFF-mode to not capture images. The head-mounted computing-device further includes a first processor that is configured by software instructions (e.g., stored in a non-transitory computer readable medium) to receive a trigger signal from an upper-limb-mounted computing-device, which indicates that the upper-limb-mounted computing-device has detected an AR-initiation gesture. Then, based on the trigger signal, the processor can configure the camera of the head-mounted computing-device from the OFF-mode to the ON-mode.

In another aspect, the present disclosure generally describes a method for controlling operation of a head-mounted augmented-reality device. The method includes configuring a camera of the head-mounted AR-device in an OFF-mode to not capture images. The method further includes receiving a trigger signal from an upper-limb-mounted computing-device, which indicates that the upper-limb-mounted computing-device has detected an AR-initiation gesture. The method further includes configuring the camera of the head-mounted AR-device in an ON-mode to capture images based on the trigger signal. The head-mounted AR-device consumes less power in the OFF-mode than in the ON-mode.

In another aspect, the present disclosure generally describes an augmented-reality system. The system includes an upper-limb-mounted computing-device that includes a gesture sensor that is configured to measure gesture data, which corresponds to movements of the upper-limb-mounted computing-device. The upper-limb-mounted computing-device further includes a processor that is configured by software instructions (e.g., stored on a non-transitory computer-readable memory) to receive the gesture data from the gesture sensor; detect an AR-initiation gesture; generate a trigger signal indicating that the AR-initiation gesture has been detected; and transmit the trigger signal to a head-mounted computing-device. The trigger signal can configure the head-mounted computing-device in an ON-mode to capture images.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 2A is a flow chart of a method for controlling operation of a head-mounted computing-device according to a first possible implementation of the present disclosure.

The components in the drawings are not necessarily to scale relative to each other. Like reference numerals designate corresponding parts throughout the several views.

DETAILED DESCRIPTION

Wearable AR-devices may have rigorous imaging and processing requirements that use substantial power. For example, a head-mounted AR-device (e.g., AR glasses) may include a camera for sensing gestures of a user. The camera can be deactivated or placed into a low-power state (i.e., an OFF-mode) to not capture images in order to (i) prevent the camera from consuming too much power and/or processing and (ii) provide privacy. The camera may be activated or placed into a high-power state (i.e., an ON-mode) to capture images when gesture detection is desired and/or appropriate for interaction with the AR environment.

A transition between the ON-mode (i.e., high-power mode) and the OFF-mode (i.e., low-power mode) can be manually initiated by a user. For example, AR glasses may include an interface device (e.g., button, touchpad, switch, etc.) that a user can manually control to trigger the camera to transition from the OFF-mode to the ON-mode (i.e., woke form sleeping). The camera can be triggered to transition from the ON-mode to the OFF-mode (i.e., put to sleep) by manual control as well.

Manual control of the camera may be problematic because it can diminish an immersive quality of an AR experience by requiring a user to consider/control the state of the camera before interfacing with the AR environment. The AR experience for a user may be improved by configuring an AR-device to respond to a user's gesture whenever it occurs (i.e., spontaneously), without any input from a user to transition states of the camera. One approach for spontaneously responding to gestures includes configuring the camera in the ON-mode perpetually (i.e., continuously). This approach is problematic, however, because a battery of an AR-device could be exhausted faster than desired due to the continuous power consumption of the camera. Additionally, this approach is problematic because the continuous capture of images can be perceived as a reduction in a user's privacy.

The disclosed systems and methods improve an AR experience and address the problems described above by providing a means to trigger gesture detection in an AR-device without a user's manual input. In other words, the disclosed systems and methods have the technical effect of sensing a gesture (i.e., movement) of a user to initiate functions in the AR-device, which would otherwise be dormant, to save power and/or provide privacy. For example, upon (or after) detecting an AR-initiation gesture, a camera of the AR-device may be configured into an ON-mode from an OFF-mode to capture images. Additionally, after the camera is activated (i.e., in an ON-mode), a processor of the AR-device may be configured to execute AR processing to identify a user's interaction (e.g., AR gestures) with the AR-device. As will be described, sensing the AR-initiation gesture, can be carried out by a one or more other devices in communication with the AR-device.

Figure 1:
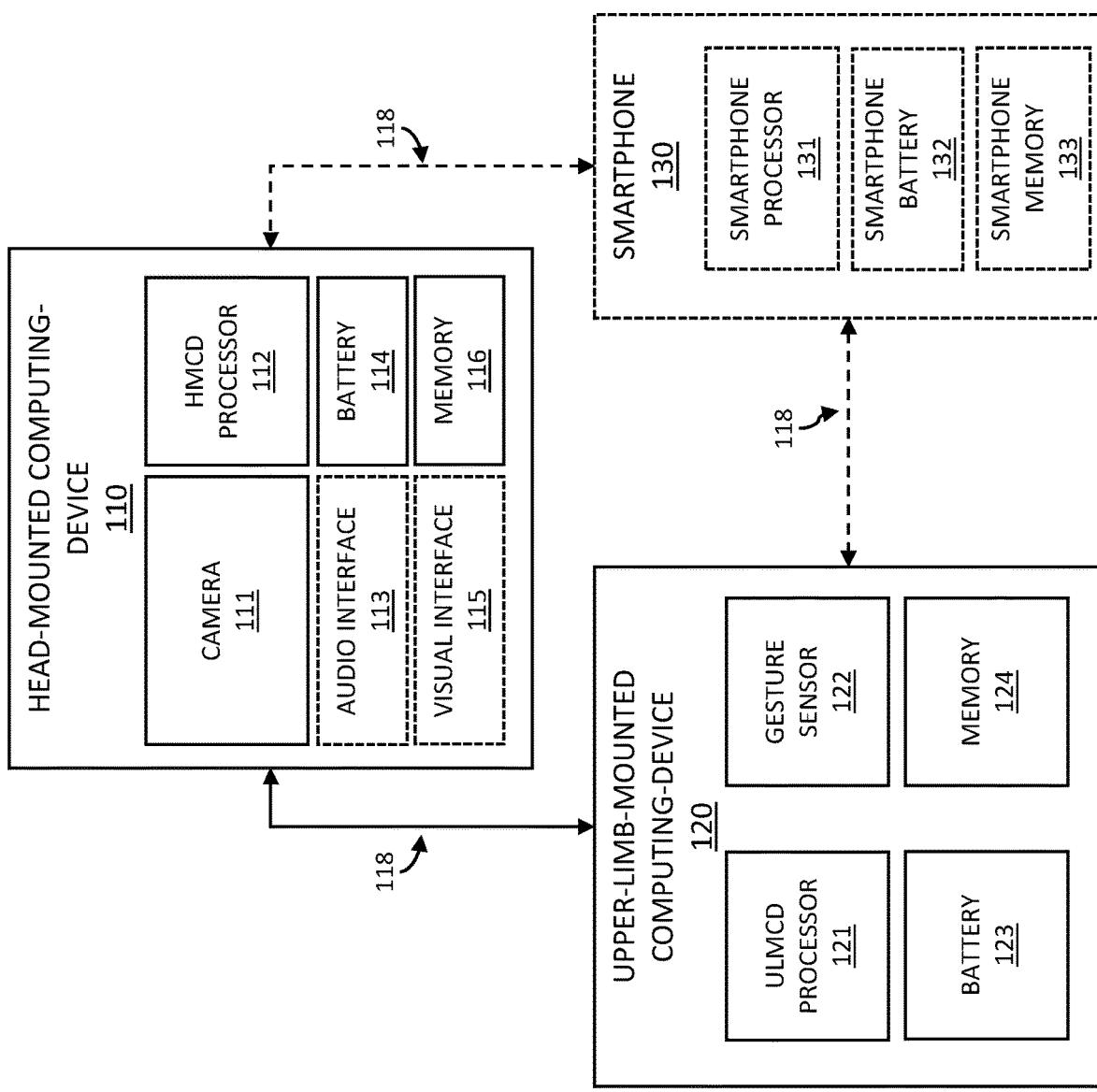
FIG. 1 is a block diagram of an augmented-reality (AR) system according to a possible implementation of the present disclosure.

FIG. 1 illustrates an AR system according to one possible implementation of the present disclosure. The AR system 100 includes an AR-device in communication with one or more other devices. As shown, the AR-device can be a computing device worn on the head or neck of a user as a head-mounted computing-device 110. The head-mounted computing-device 110 can be portable and configured by various components and circuitry to sense a user and/or the user's environment; to process the sensed information to determine AR information; and to display the AR information to the user. In other words, the head-mounted computing-device can be a head-mounted AR-device, such as AR glasses.

The head-mounted computing-device 110 can include a camera 111 that can be configured to capture data and/or images of a user's environment. In some possible implementations, the camera may be configured to capture reflections and/or radiations of an environment that are in a portion of the spectrum (e.g., visible, infrared (IR), etc.) to generate black and white (B/W) and/or color (RGB) images. For example, the camera can be a B/W camera, an RGB camera, or an IR camera. In other possible implementations, the camera can be configured to sense a range between the camera to generate depth images of the environment. For example, the camera can be a light detecting and ranging (LIDAR) camera or a depth sensor.

The head-mounted computing-device 110 can further include a head-mounted computing-device processor (i.e., HMCD processor 112) that when configured by software instructions stored in a computer-readable memory 116 can carry out algorithms (e.g., computer-vision algorithms) to analyze the captured images to detect and interpret items relative to the AR, such as a user's gestures to interact with portions of an AR environment displayed to the user. The head-mounted computing-device may include one or more interfaces to display portions of an AR environment to the user. For example, the head-mounted computing-device can include an audio interface 113 (e.g., speaker) to display sounds to a user and/or a visual interface 115 (e.g., display) to display images to a user.

The head-mounted computing-device 110 can be wireless. Accordingly, the head-mounted computing-device 110 can include a power supply (e.g., a battery) configured to supply the components and circuitry of the head-mounted computing-device 110 power for operation. A head-mounted computing device battery (i.e., HMCD battery 114) may have a physical size that balances portability with charge time. In most cases it is desirable to make the circuitry and components of the head-mounted computing-device 110 operate as efficiently as possible to maximize a charge time for a selected battery size. A battery size may be selected to minimize weight and enhance visual appeal of the head-mounted computing-device 110. Additionally, the head-mounted computing-device 110 can be configured to communicate wirelessly (e.g., via radio frequencies (RF)) with the one or more other devices via a wireless communication link 118. The wireless communication link 118 can correspond to a wireless network, such as Bluetooth or WiFi.

The AR system 100 shown in FIG. 1 illustrates the head-mounted computing-device 110 in communication with an upper-limb-mounted computing-device 120. The upper-limb-mounted computing-device 120 can be portable and configured by various components and circuitry to sense a user and to display information to the user. In some implementations, the AR system includes only the head-mounted computing-device 110 and the upper-limb-mounted computing-device 120, while in other implementations the upper-limb-mounted computing-device 120 (and the head-mounted computing-device 110) may be communicatively coupled (i.e., tethered) via the wireless communication link 118 with a smartphone 130. In these implementations, the upper-limb-mounted computing-device 120 may serve as an interface for the smartphone 130 to receive sensed information from a user or user input and may serve as a display for the smartphone 130 to present information to a user. While the upper-limb-mounted computing-device 120 can have its own upper-limb-mounted computing-device processor (i.e., ULMCD processor 121), a smartphone processor 131 of the smartphone 130 may be utilized to process information for the upper-limb-mounted computing-device 120 because, in some implementations, the smartphone processor 131, smartphone battery 132, and/or smartphone memory 133 may be better suited (e.g., larger, faster, etc.) than the ULMCD processor 121, ULMCD battery 123, and/or ULMCD memory 124. As will be discussed later, a smart watch is one possible implementation of the upper-limb-mounted computing-device 120.

The upper-limb-mounted computing-device 120 can be worn on a finger, a hand, a wrist, or an arm of a user and may include a sensor (i.e., gesture sensor 122) to measure movement, position, and/or orientation (i.e., gesture data) corresponding to the finger, the hand, the wrist, or the arm of the user. The gesture sensor may be further configured to transmit the gesture data to a processor (i.e., first processor). When the upper-limb-mounted computing-device 120 is operated alone, the first processor may be the ULMCD processor 121. Alternatively, when the upper-limb-mounted computing-device 120 is tethered to the smartphone 130, the first processor may be the smartphone processor 131. In either case, the first processor can be configured to receive the gesture data, detect an AR-initiation gesture (e.g., raising a hand) based on the received gesture data, and transmit a trigger signal after (e.g., immediately after) the detection of the AR-initiation gesture. The trigger signal may be transmitted via the wireless communication link 118 to the head-mounted computing-device 110. The HMCD processor 112 of the head-mounted computing-device 110 (i.e., a second processor) can be configured to receive the trigger signal and based on the trigger signal, be configured to transition from a lower-power state (e.g., low-power state, high-power mode) to a higher-power state (e.g., high-power state, high-power mode).

In the lower-power state the head-mounted computing-device 110 consumes less power than in the higher-power state. The power consumption in the lower-power mode may be reduced by disabling one or more components and/or one or more operations of one or more components. For example, imaging of the camera of the head-mounted computing-device may be disabled in the low-power mode. In other words, the camera may have an OFF-mode (i.e., non-imaging mode) in which no images are captured by the camera and an ON-mode (i.e., imaging mode) in which images are captured by the camera. The camera may consume more power in the ON-mode than in the OFF-mode. In a possible implementation, the camera consumes no power in the OFF-mode because power to the camera is turned OFF. In another possible implementation the OFF-mode camera refers to imaging. In other words, the OFF-mode can be a low-power mode (e.g., sleep mode) in which the camera is powered but not imaging. In any case, switching the camera from the ON-mode to the OFF-mode can prolong use-periods between charging the HMCD battery 114.

The power consumption in the lower-power state may be also reduced by reducing processing running on the HMCD processor. For example, in the lower-power mode, processes related to imaging may be ended. Further processes related to image processing (e.g., computer vision, recognition, etc.). These processes may be restarted when the head-mounted computing-device is triggered to enter the higher-power state.

As mentioned, entering a low-power mode (i.e., sleep mode) may include turning OFF power or reducing power supplied to the camera 111 and deactivating all or a portion of processing related to the camera 111 and to AR functions (e.g. gesture detection/interpretation). Exiting the low-power mode (i.e., waking) may include turning-ON power or increasing power supplied to the camera 111 and activating all or a portion of processing related to the camera 111 and to some AR functions (e.g. gesture detection/interpretation).

In one possible implementation, an AR device receives a trigger from another device after the other device detects an AR-initiation gesture. The trigger causes the AR device to begin capturing images and processing the images to identify gestures.

The detection of the AR-initiation gesture can be based on a model that relates (e.g., correlates) measured gesture data to a model based on training data collected from a plurality of trials with a variety of trial variations. The detection of the AR-intuition gesture detection may be classified as a true-positive when a movement of a user is accurately detected (i.e., classified) as an AR-initiation gesture. Alternatively, the detection of the AR-initiation gesture may be classified as a false-positive, meaning that a movement of a user was inaccurately detected (i.e., classified) as an AR-initiation gesture. The accuracy of the model may correspond to a number of false-positives versus a number of detections (i.e., false-positive rate). The false-positive rate may be non-zero and vary based on a user, device, and/or environment. Additionally, or alternatively, the accuracy of the model may correspond to a number of true-positives versus a number of detection (i.e., true-positive rate). The true-positive rate may be less than one hundred percent and may vary based on a user, device, and/or environment. The model may be updated, routinely or as needed, to improve an accuracy of the detection of the AR-initiation gesture. For example, a model may be updated based on gesture data that produced a true-positive to become more likely to classify similar gesture data as an AR-initiation gesture. Likewise, the model may be updated based on gesture data that produced a false-positive to be less likely to classify similar gesture data as an AR-initiation gesture.

The AR system 100 may include a means to update a model used for detecting the AR-initiation gesture based on use. In one possible implementation, after receiving a trigger signal to wake the camera 111, the second processor (e.g., HMCD processor 112) may be configured to analyze images captured (e.g., immediately after waking) to identify a gesture (i.e., gesture identification) and/or to recognize an object (i.e., object recognition). The presence or absence of the gesture and/or object may be used to classify the previous AR-initiation gesture detection as a true-positive or as a false-positive. For example, if gesture data corresponding to a raised hand results in the detection of an AR-initiation gesture, then images captured by the camera 111 (e.g., immediately after the detection) may be analyzed to confirm that the hand is indeed raised. If the analysis results in the identification of a raised hand, then the model may be updated to classify similar (e.g., the same) gesture data, obtained in the future, as an AR-initiation gesture; however, if the analysis results in no identification of a raised hand, then the model may be updated to not classify similar (e.g., the same) gesture data, obtained in the future, as an AR-initiation gesture.

In other words, an accuracy of the detection may be assessed. Then, based on this assessment, a model used by the first processor (i.e., the ULMCD processor 121 or the smartphone processor 131) for detecting the AR-initiation gesture may be updated. In other words, based on the accuracy, the second processor (i.e., the HMCD processor 112) may send information to the first processor to update the model for detecting the AR-initiation gesture. The model may be stored in any memory of the AR system 100. For example, if the first processor is the ULMCD processor 121, then the model may be stored in the ULMCD memory 124 and if the first processor is the smartphone processor 131, then the model may be stored in the smartphone memory 133.

The AR system 100 described thus far may be used to perform a method for controlling operation of a head-mounted computing device. A flow chart of one possible implementation of a method of AR gesture identification is shown in FIG. 2A. In the method 200 implementation, a head-mounted computing-device used for AR (i.e., a head-mounted AR-device) may be configured for lower power consumption 205, and increased privacy, by turning-OFF 210 imaging of a camera (i.e., configuring the camera in an OFF-mode). Gesture data, resulting from movement a user, may then be collected 220 using a device other than the head-mounted device. For example, the gesture data of an upper limb of a user may be collected 220 using an upper-limb-mounted computing device (ULMCD) worn on the upper limb of the user. The gesture data may be analyzed by a processor, such as the ULMCD processor or a processor of another device (e.g., smartphone, AR-device) that is in communication with the ULMCD. By analyzing the gesture data, an AR-initiation gesture may be detected 230. The detection of the AR-initiation gesture may then cause (e.g., trigger) the head-mounted AR-device to turn ON 240 imaging of the camera (i.e., configure the camera in an ON-mode) and thereby enter a higher power consumption 235 and decreased privacy mode. Additionally, the detection of the AR-initiation gesture may trigger certain processing. For example, images captured 250 by the camera may be analyzed 270 to identify gestures (AR-gestures) and/or objects. Configuring the head-mounted AR-device for AR (e.g., AR imaging, AR processing) can be triggered by a trigger signal sent wirelessly from the ULMCD to the head-mounted AR-device. This portion of the method 200 is illustrated in FIG. 3.

Figure 3:
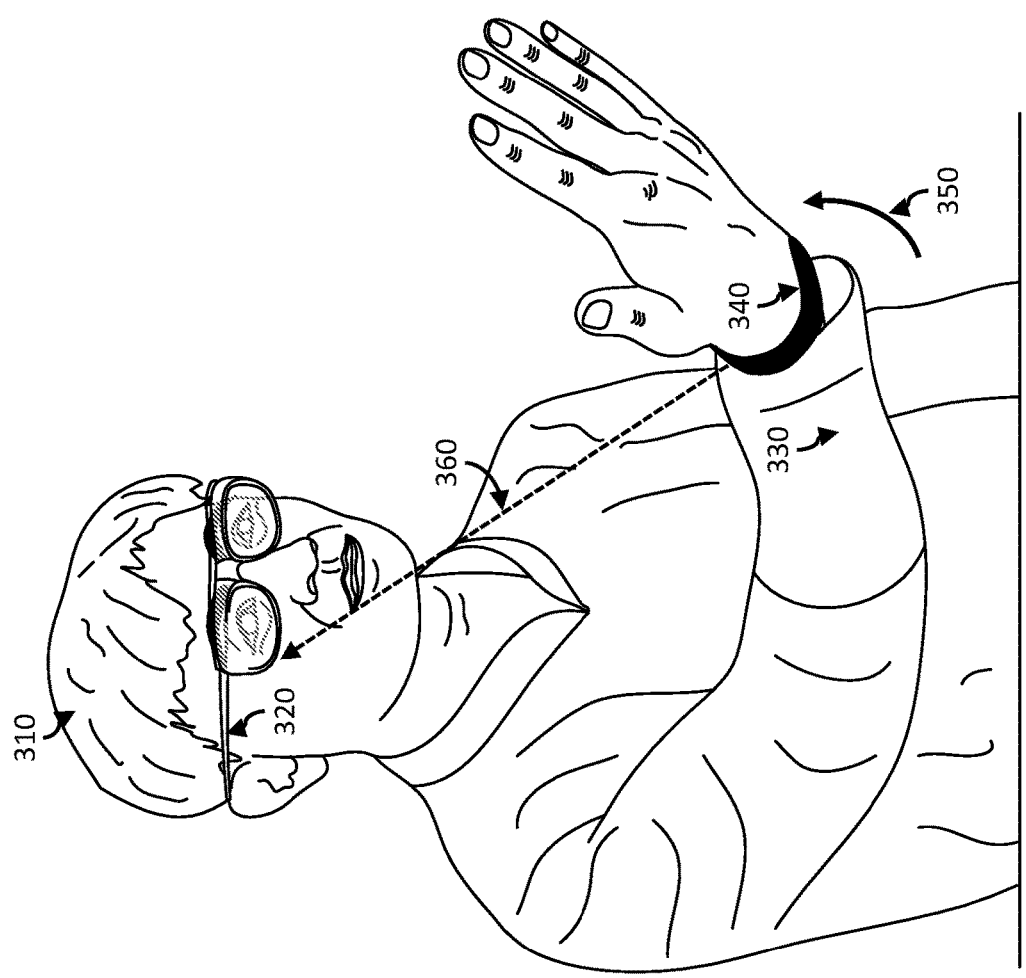
FIG. 3 illustrates a perspective view of an AR system operated by a user according to a possible implementation of the present disclosure.

FIG. 3 illustrates a perspective view of an AR system operated by a user according to a possible implementation of the present disclosure. The AR system includes a head-mounted AR-device 320 (e.g., a pair of AR glasses) that are worn on the head of a user 310. The user 310 also wears a ULMCD 340 (e.g., smart watch or smart band) on a portion (e.g., wrist) of the upper limb 330 of a user. The ULMCD 340 is configured with a gesture sensor (e.g., inertial measurement unit) to measure gesture data (e.g., velocity, acceleration, position, orientation, etc.) of the portion of the upper limb 330 of a user. When a movement 350 (e.g., raising a hand) is detected as an AR-gesture the ULMCD 340 may transmit (e.g., wirelessly) a trigger signal 360 to the head-mounted AR-device 320 to cause a transition from a lower-power consumption (and higher privacy) mode to a higher-power consumption (and lower privacy) mode. In other words, the trigger signal 360 may wake a sleeping head-mounted AR device for AR operation.

Returning to FIG. 2A, in a possible implementation the method 200 can further include steps to improve an accuracy of the AR-gesture detection. For example, the captured images (e.g., immediately after waking) may be analyzed to determine (i.e., compute, assess) an accuracy of the AR-initiation gesture detection (e.g., that just occurred). Based on this accuracy assessment 255, a model for detecting AR-initiation gestures may be updated 260. When the accuracy assessment 255 indicates that the detection of the AR-initiation gesture was inaccurate (i.e., a false-positive) then the head-mounted AR device may return to the lower power consumption 205 mode and the model may be updated to become less likely to trigger based on similar data (i.e., negative update). When the accuracy assessment 255 indicates that the detection of the AR-initiation gesture was accurate (i.e., a true-positive) then the head-mounted AR device may remain in the higher power consumption 235 mode and the model may be updated to become more likely to trigger based on similar data (i.e., positive update). This is just one possible approach for updating the model. For example, the model may receive positive updates but no negative updates. Alternatively, the model may receive negative updates but no positive updates. Further, the accuracy assessment may include one or more threshold comparisons to determine when positive updates and/or negative updates occur. Variations, such as these, are within the scope of the present disclosure.

After the camera begins to capture images, processes on a processor of the head-mounted AR-device may be launched to analyze the captured images to identify 270, interpret, and respond to AR gestures. The images and processing may be used to interact with an AR environment. The processor of the head-mounted AR-device may be configured to measure time periods between identified AR-gestures to determine when a user is finished interacting with the AR environment. For example, when no AR-gestures are identified within a period 275 (i.e., time-out period), the head-mounted AR-device may be returned to the lower power consumption 205 mode by turning-OFF 210 imaging of the camera.

Figure 2B:
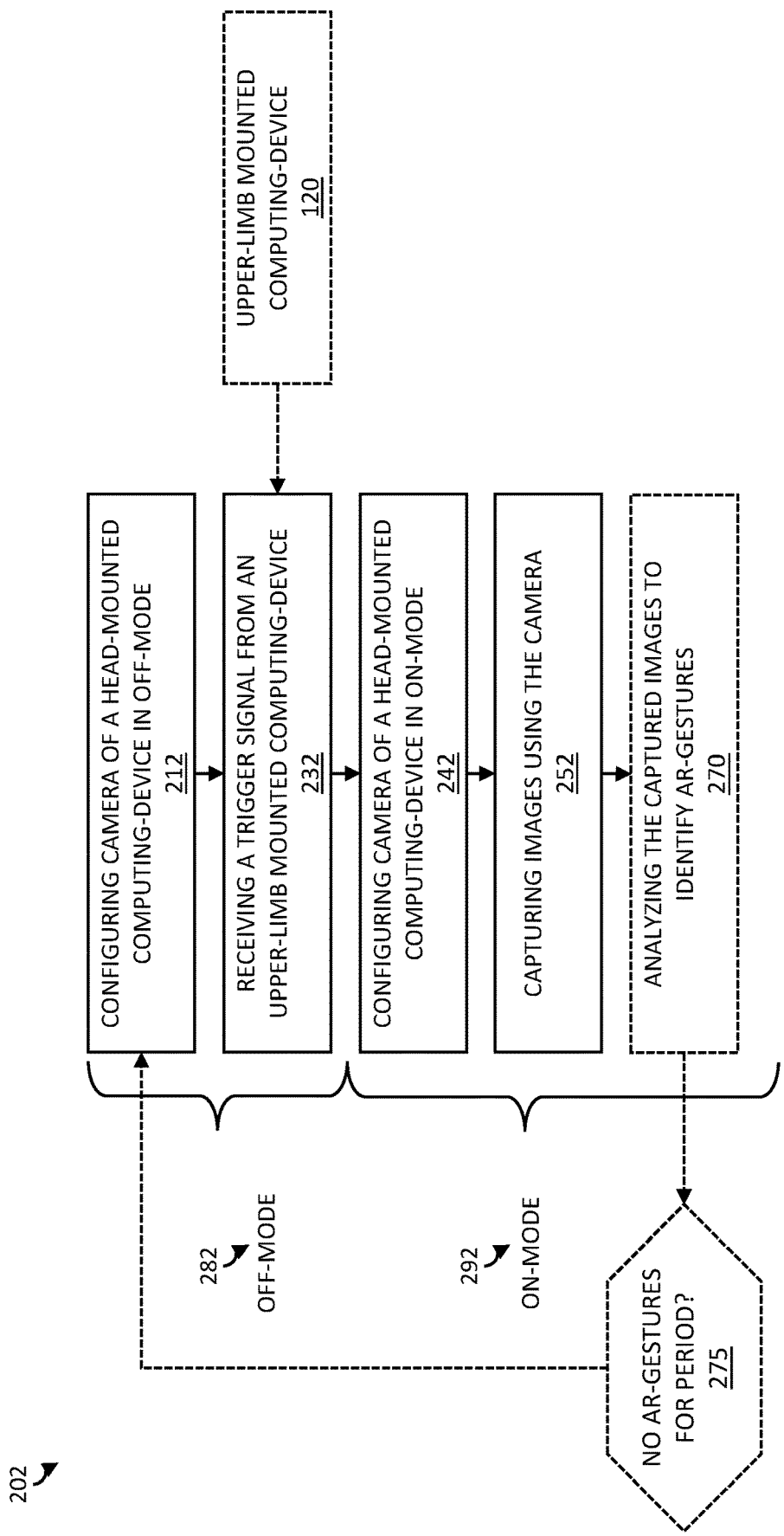
FIG. 2B is a flow chart of a method for controlling operation of a head-mounted computing-device according to a second possible implementation of the present disclosure.

The method may be considered from the perspective of the AR device. FIG. 2B is a flow chart of a method for controlling operation of a head-mounted computing device according to a second possible implementation. In the method 202, a camera of a head-mounted computing-device (i.e., worn by a user) may be configured 212 in an OFF-mode 282. The head-mounted computing-device may then receive 232 a trigger signal from an upper-limb-mounted computing-device 120 (i.e., worn by the user). The trigger signal indicates to the head-mounting computing-device, that an AR-initiation gesture has been detected by the upper-limb-mounted computing device. The trigger signal may cause the camera to be configured 242 from the OFF-mode to an ON-mode 292. In the ON-mode, the camera begins to capture 252 images. In some implementations, the captured images may then be analyzed 270 to identify AR-gestures, and if no AR-gestures are identified for a period 275, the camera may be configured 212 in the OFF-mode to conserve energy and preserve privacy.

Figure 2C:
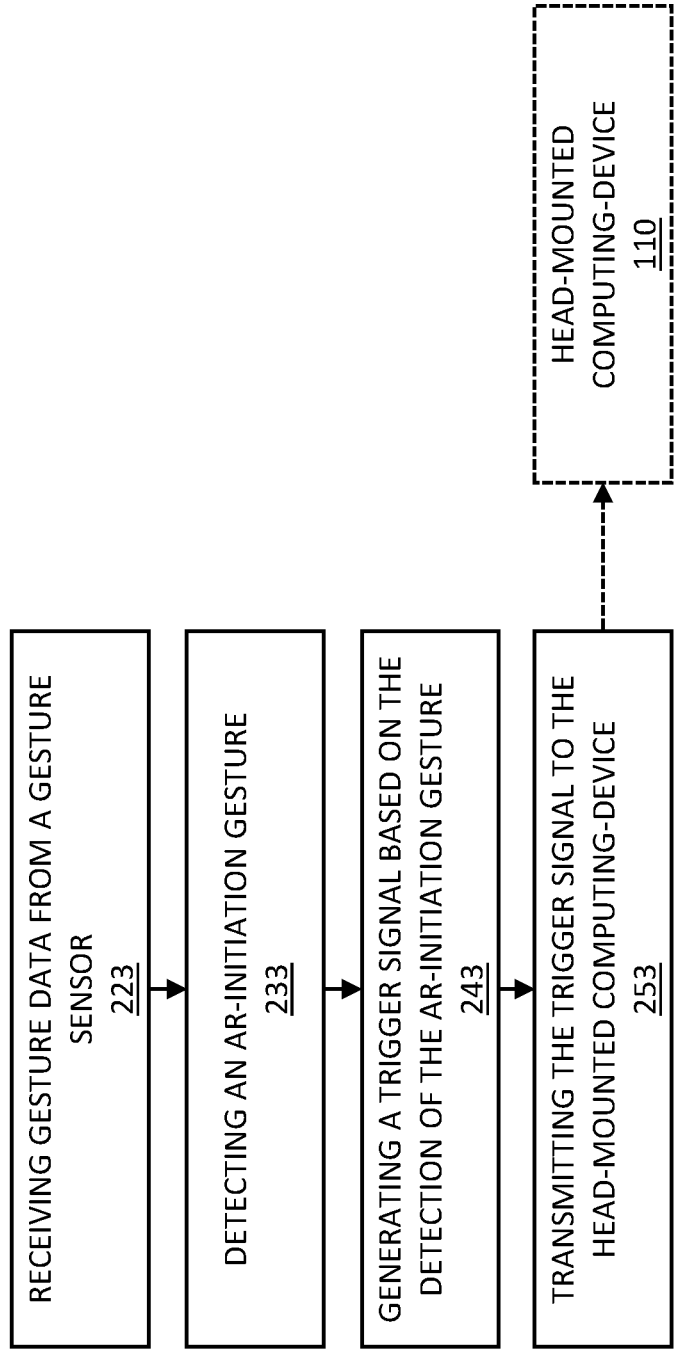
FIG. 2C is a flow chart of a method for controlling operation of a head-mounted augmented-reality (AR) device according to a third possible implementation of the present disclosure.

The method may be considered from the perspective of the upper-limb-mounted computing-device. FIG. 2C is a flow chart of a method for controlling operation of a head-mounted computing device according to a third possible implementation. In the method 203, gesture data from a gesture sensor of the upper-limb-mounted computing-device may be received 223. A trigger signal may be generated 243 when an AR-initiation gesture is detected 233 in the gesture data. The trigger signal may then be transmitted 253 to a head-mounted computing-device 110. The trigger signal may cause the head-mounted computing device to begin imaging.

Figure 4A:
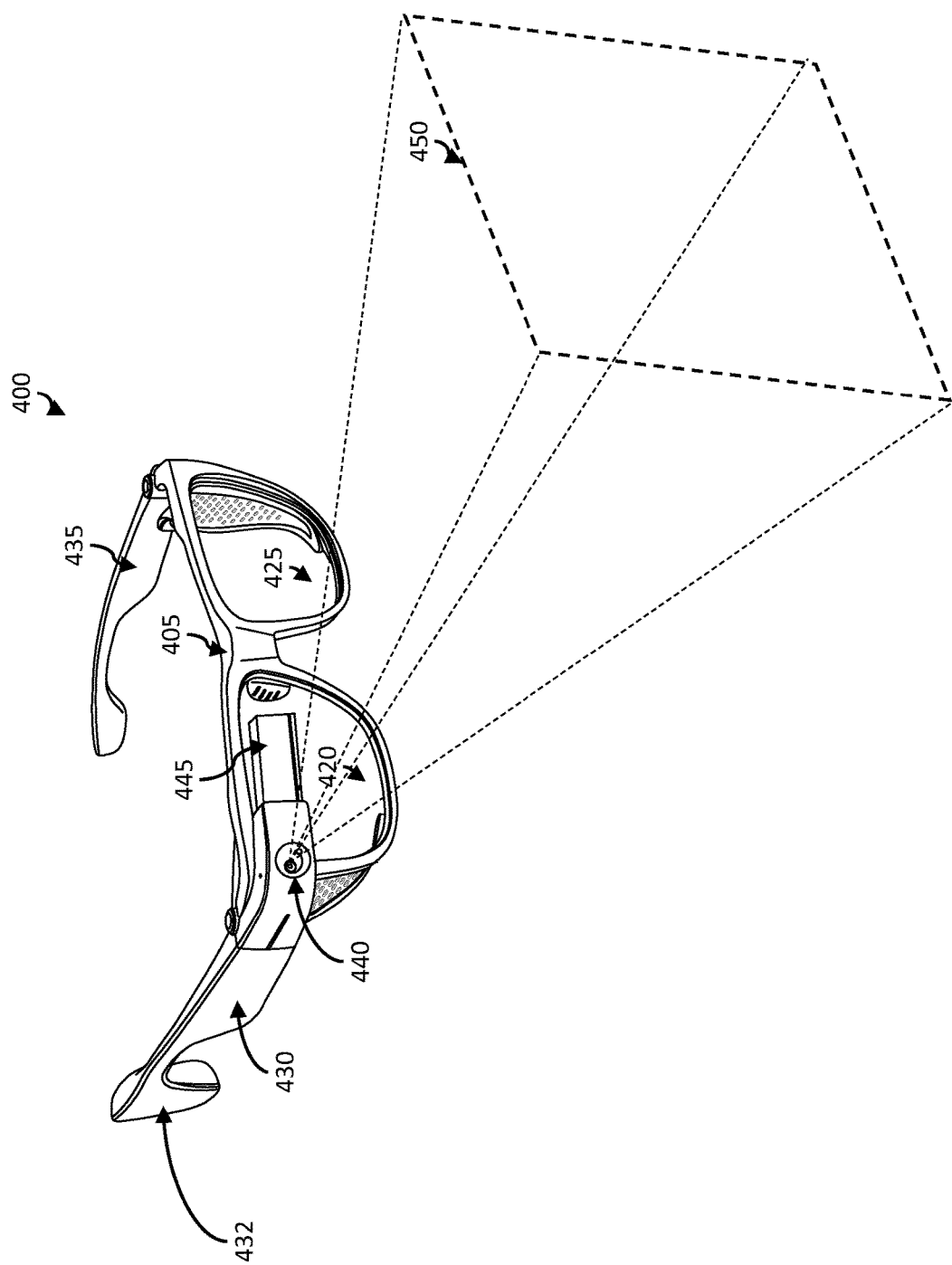
FIG. 4A illustrates a first possible implementation of AR-glasses as a head-mounted computing-device.

The head-mounted computing-device of the AR system may be implemented variously. For example, the head-mounted computing-device may be implemented as AR-glasses, which may also be implemented variously. FIG. 4A illustrates a first possible implementation of AR-glasses. The AR glasses 400 can include at least a lens frame 405, a first lens element 420, a second lens element 425, a first side-arm 430, a second side-arm 435, an image capture device (e.g., a camera 440), and a display 445.

The lens frame 405, first side-arm 430 and second side-arm 435 may be configured to support and contain components, circuitry, and interconnects. For example, the first side-arm may have a portion 432 configured to support a battery (e.g., rechargeable battery). The size of the portion 432 may limit size of the battery and its corresponding available energy between charging. The techniques described herein may be advantageous because they may help to extend the life of the battery. In other words, the techniques disclosed herein may help to extend a useable period of the AR device between charges. The lens frame 405, the first side-arm 430 and/or the second side-arm 435 may further support and enclose a processor (not shown), memory (not shown), and an audio interface (not shown).

The audio interface may include a speaker or speakers (cone, bone-conduction, etc.) to convey audio to a user. Additionally, the audio interface may include one or more microphones to capture sounds, such as voice commands from a user.

The AR glasses 400 may include a display 445. The display may include a projector to project images and a prism to route the images to a user's eye. Additionally, light from a field-of-view 450 may pass through the prism to an eye of a user, thereby making the displayed images appear overlaid onto the environment observed by the user. In other words, the display and glasses may function as a heads-up display (HUD) for the user. The prism may be separate from the first lens element 420 or the second lens element 425 as shown in FIG. 4A; however, in in another possible implementation it may be less conspicuous.

Figure 4B:
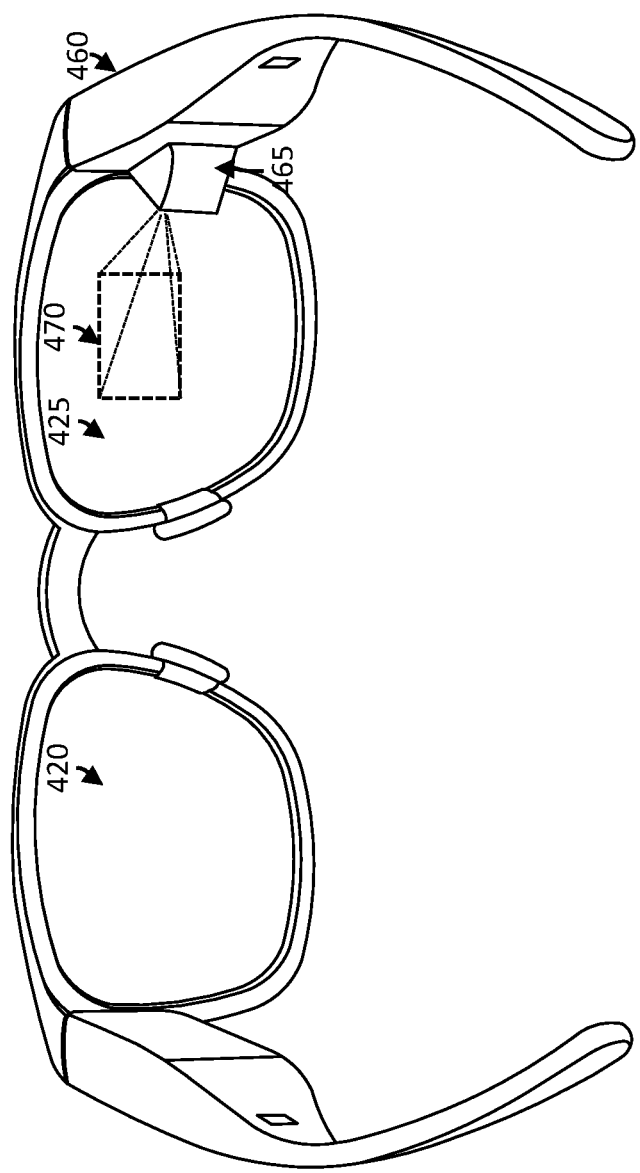
FIG. 4B illustrates a second possible implementation of AR-glasses as a head-mounted computing device.

The prism may be incorporated in the first lens element 420 and/or the second lens element 425. For example, a coating on a surface of the first lens element 420 and/or the second lens element 425 may partially reflect a projected image while also allowing light from a field of view to pass through to the user. FIG. 4B illustrates a second possible implementation of AR-glasses in which the second lens element 425 is used as a prism for the HUD. A projector 465 integrated in a side-arm 460 of the AR glasses may project images in an area 470 of the second lens element 425. The projected images can be reflected from the area to an eye of the user. The present disclosure is not limited to projector/prism implementations and recognizes that other variations used in heads up displays can exist. For example, the lens elements may be transparent display elements that can be electronically addressed to pass or block light (e.g., liquid crystal display) or to electronically illuminate (e.g., organic LED display). In these implementations, a projector may not be necessary.

Returning for FIG. 4A, the AR glasses 400 may also include a camera 440. The camera 440 can be aligned to capture images of the field-of-view 450. In other words, the camera 440 may capture images that correspond to what a user wearing the AR glasses 400 is viewing. The camera may be configured to capture images (e.g., still, video) at various resolutions and at different frame rates. While a single camera 440 is illustrated in FIG. 4A, more cameras may be included in the AR glasses 400. For implementations including more than one camera, the disclosed techniques may be used to wake and sleep each of the cameras.

The AR glasses can be used to interpret certain gestures (e.g., by a wearer's hand or hands) as user input. For example, the AR glasses 400 can capture hand gestures by analyzing image data from the camera 440, and initiate tasks that are defined as corresponding to certain gestures. Further, a speaker and a microphone in the AR glasses can be used as input/output components. For example, the microphone can detect speech that can be used to supplement and/or modify the intent associated with the hand gesture. The speaker can be configured to output an audible signal that can be heard by the user. The audible signal can be associated with the task associated with the task (or tasks) that are responsive to the hand gesture. For example, the audible signal can be a beep indicating a task has been completed.

Figure 5:
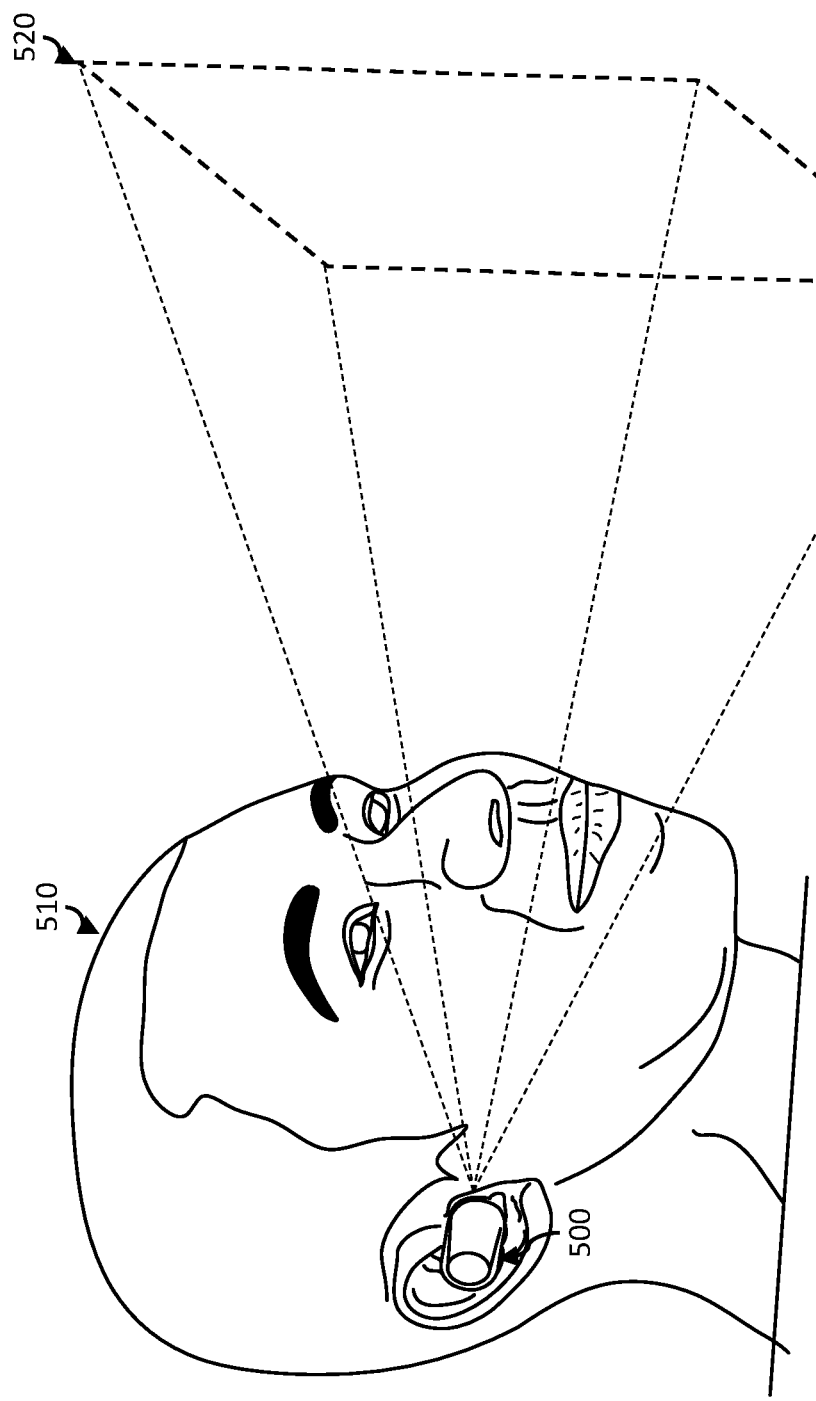
FIG. 5 illustrates a second possible implementation of a head-mounted computing device.

The head-mounted computing-device of the AR system may not be required to function as a heads-up display. FIG. 5 illustrates a second possible implementation of a head-mounted computing-device. As shown, the head-mounted computing-device may be an AR ear-mounted sound device (i.e., earbud). The AR earbud 500 may include an earpiece that is configured for mounting inside an ear of a user. The AR earbud 500 may include a speaker that is configured to present audio to a user. The AR earbud may also include a camera. The camera may be aligned so that when the AR earbud is worn in the ear of the user 510, the camera images the field of view 520 of the user 510. Accordingly, the AR earbud may analyze images captured by the camera and transmit AR audio to a user based on this analysis.

The upper-limb of a user includes an upper arm portion, a forearm portion, a wrist portion, a hand portion, and finger portions. The upper-limb-mounted computing-device may be mounted to (i.e., affixed to, worn on) any portion of the upper-limb and includes a gesture sensor configured to sense (i.e., measure) movement, position, and/or orientation (i.e., gesture data) of the portion to which it is affixed. The gesture sensor can be an application specific hardware component that allows the measurement of gesture data to be performed in a power efficient manner.

The gesture sensor in an upper-limb-mounted computing-device may be implemented variously. In one possible implementation, the gesture sensor is an inertial measurement unit (IMU). The IMU may include any combination of an accelerometer configured to measure velocity and acceleration, a gyroscope configured to measure rotation and rotational rate, and a magnetometer to establish a cardinal direction.

In another possible implementation the gesture sensor is a time-of-flight (ToF) measurement unit. The ToF measurement unit may include one or more range modules. Each range module includes, at least, a modulated light source, an image sensor, and a processing unit that is configured to determine a phase shift between light transmitted from the light source and light received by the image sensor. In this way each range module can determine a time (i.e., range) that the light traveled. The results from multiple range modules can be combined to determine gesture data.

In another possible implementation, the gesture sensor is a radar measurement unit. The radar measurement unit operates like the ToF measurement unit but with each range module configured to transmit/receive ultra-wideband (UWB) radio frequency (RF) pulses.

Figure 6:
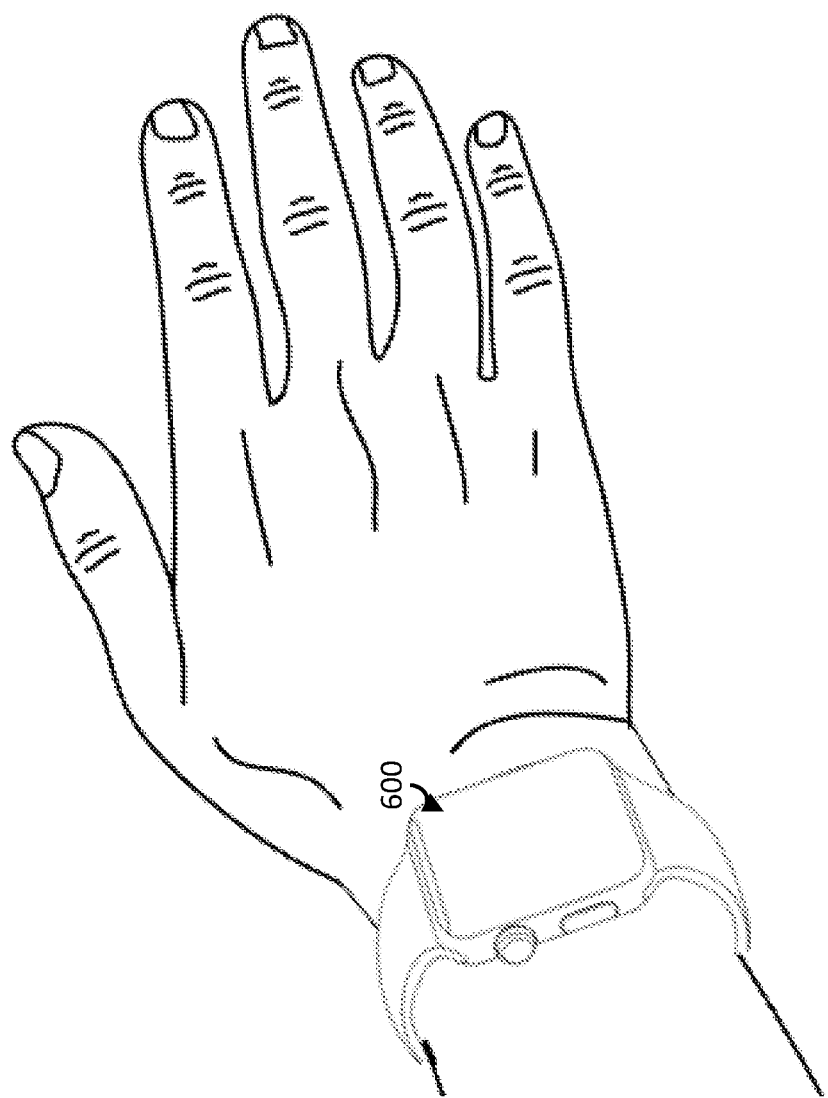
FIG. 6 illustrates a first possible implementation of an upper-limb-mounted computing-device.

FIG. 6 illustrates a first possible implementation of an upper-limb-mounted computing-device. As shown, the upper-limb-mounted computing-device may be a smart watch. The smart watch 600 is worn on a wrist portion of an upper limb of a user. The smart watch includes a gesture sensor, such as described above. In one possible implementation, the smart watch includes a processor configured to analyze the measured gesture data to detect an AR-initiation gesture. For example, the AR-initiation gesture may be a raising of the wrist portion. In another possible implementation, the smart watch transmits the measured gesture data to a smart phone for analysis. In this implementation, a processor of the smart phone may be configured to analyze the gesture data to detect an AR-initiation gesture. This implementation may advantageously utilize larger processing and/or battery resources of the smartphone. The present disclosure recognizes that other variations to optimize resources may exist.

Figure 7:
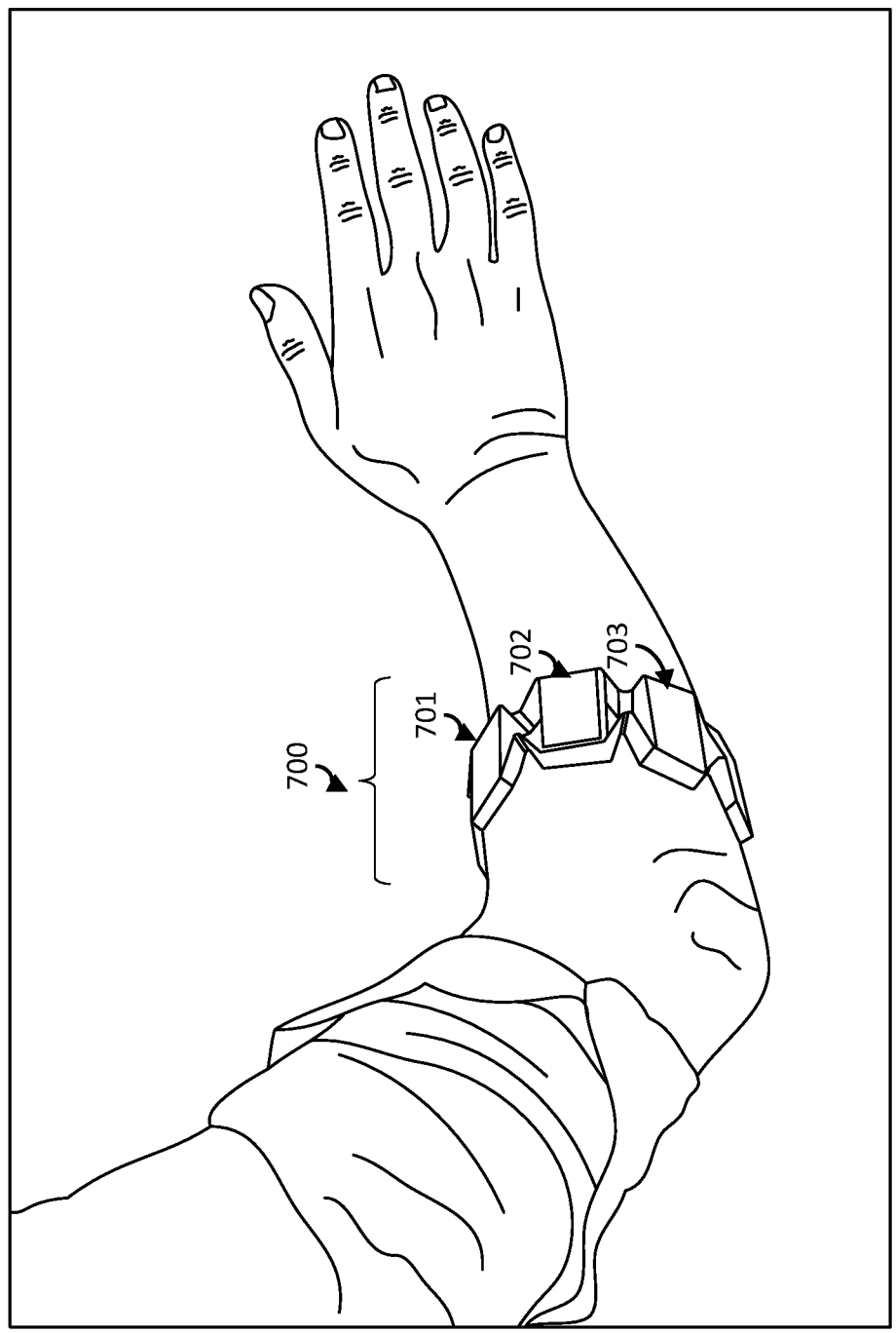
FIG. 7 illustrates a second possible implementation of an upper-limb-mounted computing-device.

FIG. 7 illustrates a second possible implementation of an upper-limb-mounted computing-device. The upper-limb-mounted computing-device may be a smart armband. The smart armband may be worn on a wrist portion of the upper-limb (e.g., as a bracelet). For example, the smart armband may be a fitness-tracking device (e.g., tethered to a smartphone). As described above, the smart armband may include gesture sensor and may process gesture data to detect an AR-initiation gesture or transmit gesture data to another device (e.g., smartphone). As shown in FIG. 7, the smart armband 700 can also be worn on a forearm portion of the upper-limb. In the implementation shown, the smart armband includes a plurality of a gesture sensors 701, 702, 703 positioned around the forearm of a user. The plurality of gesture sensor may be used to determine hand gestures by measuring muscle movement of the forearm. Accordingly, the AR-initiation gesture may include movements of the forearm associated with raising the hand or may include forearm movements associated with a hand gesture, such as waving the hand.

Figure 8:
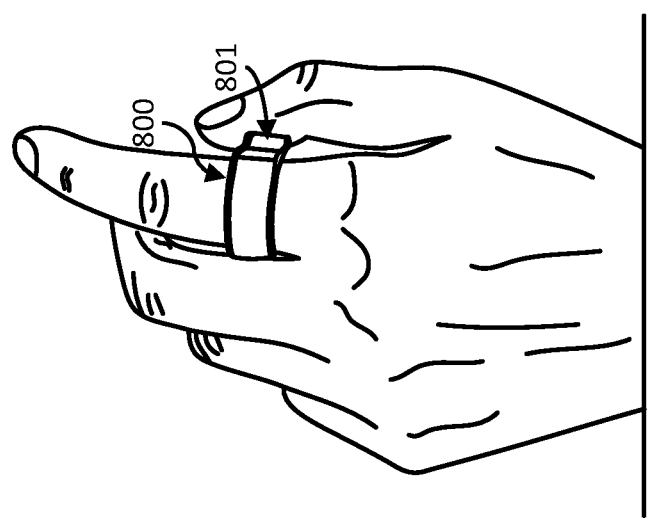
FIG. 8 illustrates a third possible implementation of an upper-limb-mounted computing-device.

FIG. 8 illustrates a third possible implementation of an upper-limb-mounted computing-device. As shown, the upper-limb-mounted computing-device may be a smart ring. The smart ring 800 may be worn on the finger of a user and may include an interface switch 801 (e.g., a button). The smart ring may include a gesture sensor, as described above, and may process gesture data to detect an AR-initiation gesture or may transmit gesture data to another device (e.g., smartphone). The AR-initiation gesture may include movements of the finger associated with raising the hand or may include finger movements associated with a hand gesture, such as waving the hand.

Figure 9:
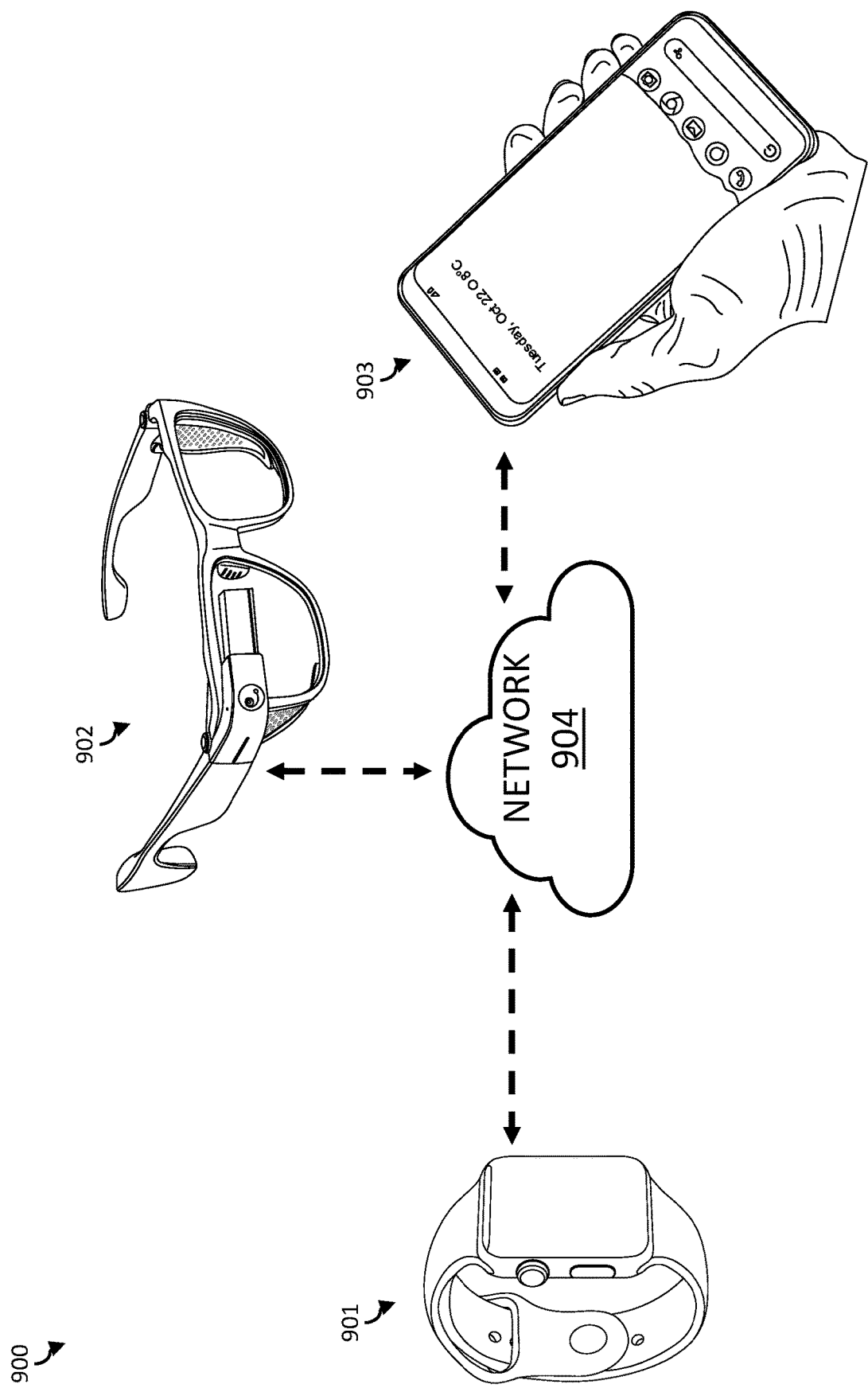
FIG. 9 illustrates an augmented-reality system according to a possible implementation of the present disclosure.

FIG. 9 illustrates a possible implementation of an augmented-reality system. The AR system 900 includes at least a smart watch 901 and AR glasses 902. In some implementations, the AR system, can further include a smartphone 903. The devices in the AR system can each be communicatively coupled to a network 904 (e.g., wireless network). The devices may communicate (e.g., gesture data, trigger signals, etc.) over the network 904. The network may be implemented as a Bluetooth network or as a WiFi network. In other words, the devices may communicate via a Bluetooth connection or via a WiFi connection.

Figure 10:
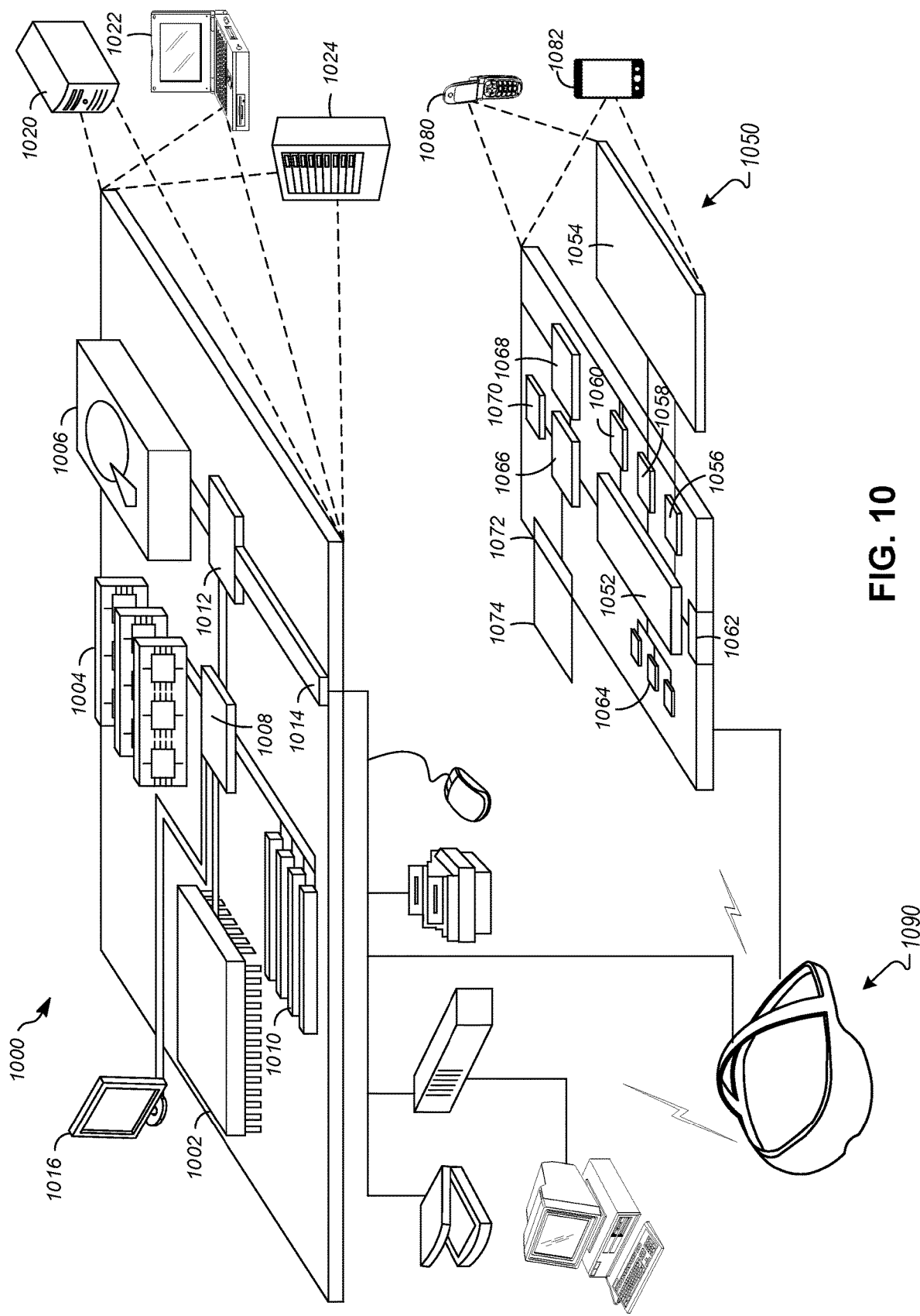
FIG. 10 illustrates an example computing device and mobile computing device that can be used to implement the disclosed techniques.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050 or may also store applications or other information for device 1050. Specifically, expansion memory 1074 may include instructions to carry out or supplement the processes described above and may include secure information also. Thus, for example, expansion memory 1074 may be provide as a security module for device 1050 and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An augmented-reality (AR) system, comprising:
a head-mounted computing-device that includes a camera that is configurable in an ON-mode to capture images or an OFF-mode to not capture images so that no images are captured by the head-mounted computing-device in the OFF-mode, the head-mounted computing-device further including a first processor configured by software instructions to:
receive a trigger signal from an upper-limb-mounted computing-device, the trigger signal corresponding to a detection of an AR-initiation gesture by an inertial measurement unit of the upper-limb-mounted computing-device;
configure the camera from the OFF-mode to the ON-mode based on the trigger signal;
configure the head-mounted computing-device to capture images in the ON-mode; and
determine an accuracy of the detection of the AR-initiation gesture by the inertial measurement unit based on the images captured by the camera.

2. The augmented-reality (AR) system according to claim 1, wherein:
when configured in the ON-mode, the camera consumes a first amount of power;
when configured in the OFF-mode, the camera consumes a second amount of power; and
the first amount of power is larger than the second amount of power.

3. The augmented-reality (AR) system according to claim 1, wherein the head-mounted computing-device is AR glasses worn on a head of a user.

4. The augmented-reality (AR) system according to claim 1, wherein the head-mounted computing-device is an AR earbud worn on a head of a user.

5. The augmented-reality (AR) system according to claim 1, further comprising the upper-limb-mounted computing-device, wherein the upper-limb-mounted computing-device includes a second processor that is in communication with the first processor of the head-mounted computing-device, the second processor configured by software instructions to:
receive gesture data from a gesture sensor of the upper-limb-mounted computing-device;
detect the AR-initiation gesture based on the gesture data; and
transmit the trigger signal to the head-mounted computing-device to transition the camera from the OFF-mode to the ON-mode.

6. The augmented-reality (AR) system according to claim 5, wherein the upper-limb-mounted computing-device is a smart watch worn on a wrist of a user.

7. The augmented-reality (AR) system according to claim 5, wherein the upper-limb-mounted computing-device is a smart ring worn on a finger of a user.

8. The augmented-reality (AR) system according to claim 5, wherein the upper-limb-mounted computing-device is a smart armband worn on an arm of a user.

9. The augmented-reality (AR) system according to claim 5, wherein the upper-limb-mounted computing-device is a smartphone held in a hand of a user.

10. The augmented-reality (AR) system according to claim 5, wherein the gesture sensor is an inertial measurement unit (IMU).

11. The augmented-reality (AR) system according to claim 5, wherein the first processor is further configured by software to:
generate information to update a model for detecting the AR-initiation gesture based on the accuracy of the detection of the AR-initiation gesture by the inertial measurement unit determined based on the images captured by the camera.

12. A method for controlling operation of a head-mounted augmented-reality (AR) device, the method comprising:
configuring a camera of the head-mounted AR-device in an OFF-mode to not capture images;
receiving a trigger signal from an upper-limb-mounted computing-device, the trigger signal corresponding to a detection of an AR-initiation gesture by an inertial measurement unit of the upper-limb-mounted computing-device;
configuring the camera of the head-mounted AR-device in an ON-mode to capture images based on the trigger signal, the head-mounted AR-device consuming less power in the OFF-mode than in the ON-mode; and
determining an accuracy of the detection of the AR-initiation gesture by the inertial measurement unit based on the images captured by the camera.

13. The method for controlling operation of a head-mounted augmented-reality (AR) device according to claim 12, wherein the trigger signal is generated based on gesture data from a gesture sensor of the upper-limb-mounted computing-device.

14. The method for controlling operation of a head-mounted augmented-reality (AR) device according to claim 12, further comprising:
 analyzing the images captured by the camera in the ON-mode to identify AR-gestures; and
 configuring the camera of the head-mounted AR-device in the OFF-mode after a period during which no AR-gestures are identified.

15. The method for controlling operation of a head-mounted augmented-reality (AR) device according to claim 12, further comprising:
 generating information to update a model for detecting the AR-initiation gesture based on the accuracy of the trigger signal.

16. An augmented-reality (AR) system, comprising:
 an upper-limb-mounted computing-device that includes:
  a gesture sensor configured to measure gesture data corresponding to movements of the upper-limb-mounted computing-device; and
  a first processor configured by software instructions to:
   receive the gesture data from the gesture sensor;
   detect an AR-initiation gesture from the gesture data based on a model;
   generate a trigger signal corresponding to a detection of the AR-initiation gesture by the gesture sensor of the upper-limb-mounted computing-device; and
   transmit the trigger signal to a head-mounted computing-device to configure the head-mounted computing-device in an ON-mode to capture images; and
 a head-mounted computing-device, the head-mounted computing-device further including a second processor configured by software instructions to:
  receive the trigger signal from the upper-limb-mounted computing-device;
  configure a camera from an OFF-mode to the ON-mode based on the trigger signal;
  determine an accuracy of the detection of the AR-initiation gesture by the gesture sensor based on the images captured by the camera; and
  update the model based on the accuracy of the trigger signal.

17. The augmented-reality (AR) system according to claim 16, wherein the upper-limb-mounted computing-device is a smart watch, a smart ring, or a smart armband.

18. The augmented-reality (AR) system according to claim 16, wherein the gesture sensor is an inertial measurement unit (IMU), a time-of-flight (ToF) measurement unit, or a radar measurement unit.

* * * * *